(12) United States Patent
Moore et al.

(10) Patent No.: US 10,954,800 B2
(45) Date of Patent: Mar. 23, 2021

(54) FLUIDIC MACHINING METHOD AND SYSTEM

(71) Applicant: United Technologies Corporation, Farmington, CT (US)

(72) Inventors: Sasha M. Moore, East Hartford, CT (US); Thomas N. Slavens, Vernon, CT (US); Nicholas M. Loricco, Coventry, CT (US); Timothy J. Jennings, South Windsor, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 282 days.

(21) Appl. No.: 16/100,257

(22) Filed: Aug. 10, 2018

(65) Prior Publication Data

US 2018/0363473 A1    Dec. 20, 2018

Related U.S. Application Data

(63) Continuation of application No. 15/037,013, filed as application No. PCT/US2014/065734 on Nov. 14, 2014, now Pat. No. 10,107,110.
(Continued)

(51) Int. Cl.
*F01D 5/18* (2006.01)
*B24C 3/32* (2006.01)
(Continued)

(52) U.S. Cl.
CPC .............. *F01D 5/187* (2013.01); *B24C 3/327* (2013.01); *C23F 1/16* (2013.01); *C23F 1/32* (2013.01);
(Continued)

(58) Field of Classification Search
CPC . F01D 5/187; F01D 9/02; F01D 25/12; F01D 11/08; C23F 1/16; C23F 1/32;
(Continued)

(56) References Cited

U.S. PATENT DOCUMENTS 3,025,189 A    3/1962   Arden
3,216,857 A    11/1965  Duvall
(Continued)

FOREIGN PATENT DOCUMENTS

EP    179013 A1    1/1989
EP    761386 A1    1/2000
(Continued)

OTHER PUBLICATIONS

E. A. McKinnon, "Fatigue Damage Alleviation by Intermittent Electroplating", ASTM International, 1976.
(Continued)

*Primary Examiner* — Moshe Wilensky
(74) *Attorney, Agent, or Firm* — Carlson, Gaskey & Olds, P.C.

(57) ABSTRACT

One exemplary embodiment of this disclosure relates to a method of forming an engine component. The method includes forming an engine component having an internal passageway, the internal passageway formed with an initial dimension. The method further includes establishing a flow of machining fluid within the internal passageway, the machining fluid changing the initial dimension.

12 Claims, 5 Drawing Sheets

Related U.S. Application Data (60) Provisional application No. 61/904,685, filed on Nov. 15, 2013.

(51) Int. Cl.
    *C23F 1/16*     (2006.01)
    *C23F 1/32*     (2006.01)
    *F01D 9/02*     (2006.01)
    *F01D 11/08*     (2006.01)
    *F01D 25/12*     (2006.01)

(52) U.S. Cl.
    CPC ............... *F01D 9/02* (2013.01); *F01D 11/08* (2013.01); *F01D 25/12* (2013.01); *F05D 2220/32* (2013.01); *F05D 2230/10* (2013.01); *F05D 2300/506* (2013.01); *Y02T 50/60* (2013.01)

(58) Field of Classification Search
    CPC . B24C 3/327; F05D 2220/32; F05D 2230/10; F05D 2300/506
    See application file for complete search history.

(56) References Cited

U.S. PATENT DOCUMENTS

| | | |
|---|---|---|
| 3,400,017 A | 9/1968 | Huebner, Jr. et al. |
| 3,607,398 A | 9/1971 | Lucas |
| 4,008,844 A | 2/1977 | Duvall et al. |
| 4,065,322 A | 12/1977 | Langford |
| 4,439,241 A | 3/1984 | Ault et al. |
| 5,247,766 A | 9/1993 | Kildea |
| 5,290,364 A | 3/1994 | Stein et al. |
| 5,391,256 A | 2/1995 | Hansen et al. |
| 5,441,574 A | 8/1995 | Hansen et al. |
| 5,575,858 A | 11/1996 | Chen et al. |
| 5,702,288 A | 12/1997 | Liebke et al. |
| 5,707,453 A | 1/1998 | Shurman et al. |
| 6,004,620 A | 12/1999 | Camm |
| 6,575,817 B2 | 6/2003 | Czech |
| 6,805,140 B2 | 10/2004 | Velez, Jr. et al. |
| 7,185,662 B2 | 3/2007 | Succop |
| 2006/0111025 A1 | 5/2006 | Yanaka et al. |
| 2008/0159874 A1 | 7/2008 | Pietraszkiewicz et al. |
| 2009/0041587 A1 | 2/2009 | Konter et al. |
| 2010/0223788 A1 | 9/2010 | Staroselsky et al. |
| 2013/0195674 A1 | 8/2013 | Watson et al. |

FOREIGN PATENT DOCUMENTS

| | | |
|---|---|---|
| EP | 2525044 A2 | 11/2012 |
| EP | 1715139 B1 | 12/2012 |
| EP | 2538029 A1 | 12/2012 |
| EP | 2573201 A2 | 3/2013 |
| EP | 1882818 B1 | 6/2013 |
| JP | 09136260 A | 5/1997 |

OTHER PUBLICATIONS

Yoshifumi Nakano and B. I. Sandor, "High Cycle Fatigue Crack Propagation Rates in Copper", ASTM International, 1974.

FLUIDIC MACHINING METHOD AND SYSTEM

BACKGROUND

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating arrays of rotating blades and stationary vanes that extend into the core flow path of the gas turbine engine. Engine components, such as turbine blades and vanes, are known to be cooled by routing a cooling fluid within one or more internal passageways.

In some examples, the internal passageways are in communication with a plurality of showerhead holes configured to create a showerhead film, which protects the component from the relatively hot gases flowing within the core flow path. The internal passageways may further be provided in a serpentine shape, including a turn section between adjacent, parallel legs. Internal passageways may include turbulators, such as trip strips, for creating turbulence within the passageways, which increases cooling effectiveness.

SUMMARY

One exemplary embodiment of this disclosure relates to a method of forming an engine component. The method includes forming an engine component having an internal passageway, the internal passageway formed with an initial dimension. The method further includes establishing a flow of machining fluid within the internal passageway, the machining fluid changing the initial dimension.

In a further embodiment of any of the above, the internal passageway is a serpentine-shaped passageway including a turn connecting two legs.

In a further embodiment of any of the above, the machining fluid enlarges a dimension of the turn.

In a further embodiment of any of the above, the machining fluid enlarges a dimension of the internal passageway.

In a further embodiment of any of the above, the internal passageway is in communication with a hole configured to communicate fluid from the internal passageway to the exterior of the component.

In a further embodiment of any of the above, the machining fluid removes burrs adjacent the interface between the internal passageway and the hole, and enlarges a dimension of the hole adjacent the internal passageway.

In a further embodiment of any of the above, the internal passageway includes at least one turbulator including a leading edge, the leading edge initially being substantially normal to an expected flow path within the internal passageway.

In a further embodiment of any of the above, the machining fluid partially erodes the leading edge and provides the turbulator with a sloped leading edge.

In a further embodiment of any of the above, the turbulator is one of a trip strip and a pedestal.

In a further embodiment of any of the above, the machining fluid is provided with a Reynolds number substantially matching an expected Reynolds number of a flow of fluid within the internal passageway during operation of an engine.

In a further embodiment of any of the above, the machining fluid is configured to partially erode a material of the engine component, and includes one of (1) a chemical solvent and (2) a suspended grit media.

In a further embodiment of any of the above, the method includes forming the engine component using one of an additive manufacturing technique, a forging process, and a casting process before introducing the machining fluid into the internal passageway.

In a further embodiment of any of the above, the engine component includes a plurality of internal passageways, and wherein a flow of machining fluid is established within each of the internal passageways.

In a further embodiment of any of the above, the machining fluid is provided in the internal passageway for a predetermined time.

Another exemplary embodiment of this disclosure relates to a system for machining an engine component. The system includes an engine component including an internal passageway, the internal passageway formed with an initial dimension. The system further includes a source of machining fluid, the source of machining fluid in communication with the internal passageway, and a control. Further, a flow of machining fluid is established within the internal passageway in response to an instruction from the control, the machining fluid configured to change the initial dimension.

In a further embodiment of any of the above, the internal passageway is a serpentine-shaped passageway including a first leg, a second leg, and a turn connecting the first and second legs, and wherein the machining fluid enlarges a dimension of the turn and a dimension of the second leg.

In a further embodiment of any of the above, the internal passageway is in communication with a hole configured to communicate fluid from the internal passageway to the exterior of the component, and wherein the machining fluid enlarges a dimension of the hole adjacent the internal passageway.

In a further embodiment of any of the above, the internal passageway includes at least one turbulator initially including a leading edge substantially normal to an expected flow path within the internal passageway, and wherein the machining fluid provides the turbulator with a curved leading edge.

In a further embodiment of any of the above, the turbulator is one of a trip strip and a pedestal.

In a further embodiment of any of the above, the engine component is one of a rotor blade, a stator vane, and a blade outer air seal (BOAS).

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows.

DETAILED DESCRIPTION

Figure 1:
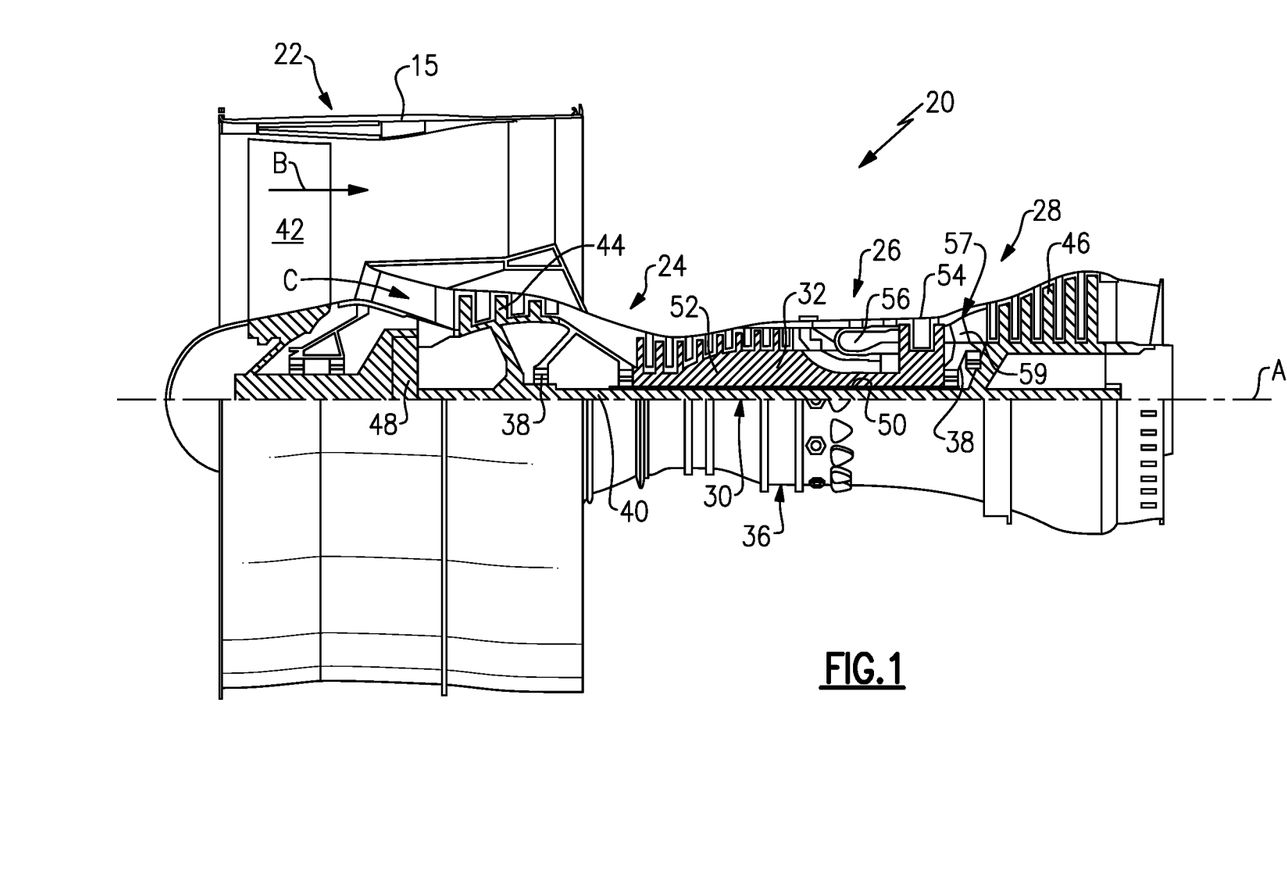
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Figure 2:
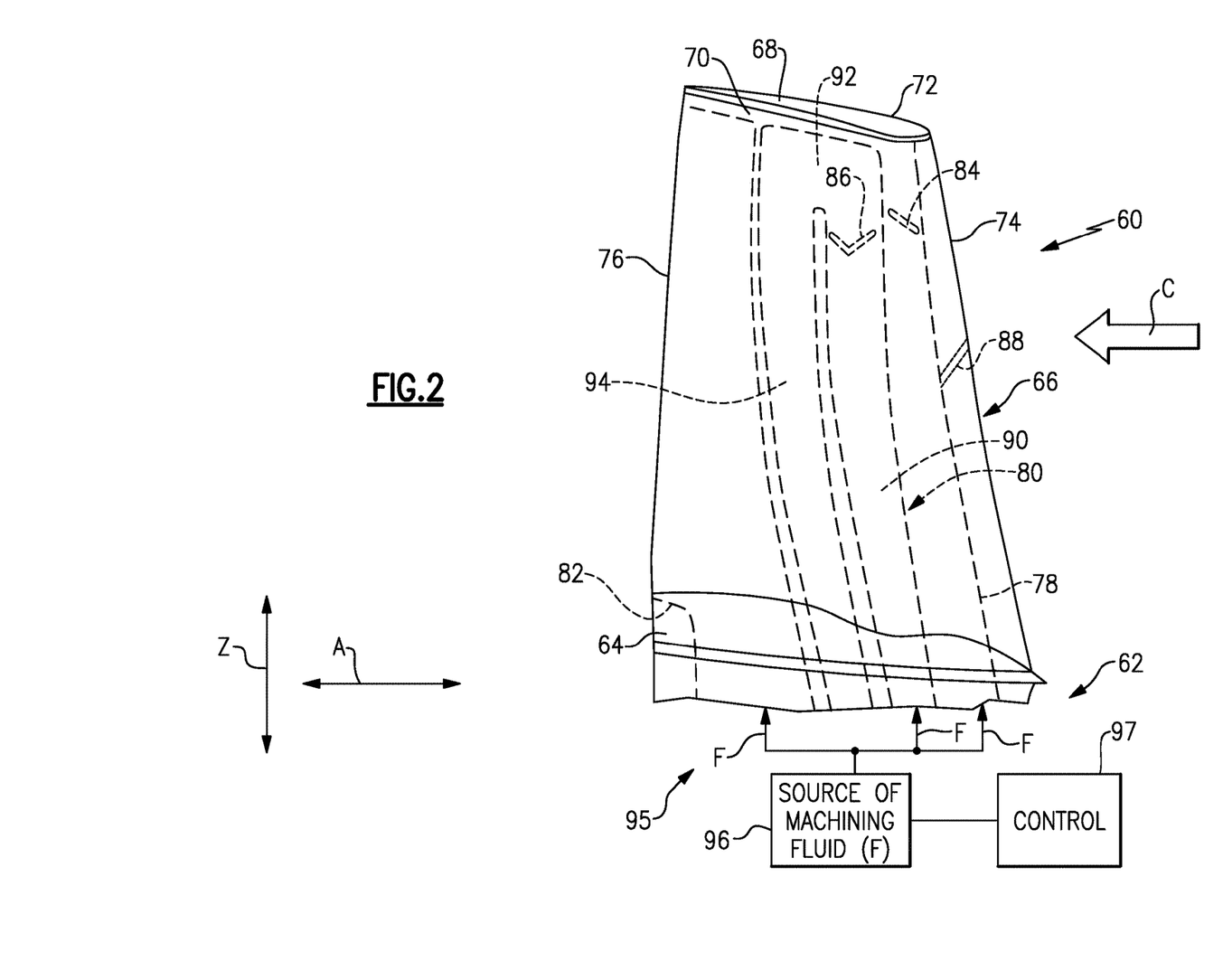
FIG. 2 illustrates an example system.

FIG. 2 illustrates an example engine component 60 arranged relative to a machining system 95. In this example, the engine component 60 is a rotor blade of the engine 20. This disclosure is not limited to rotor blades, however, and extends to other engine components such as stator vanes, blade outer air seals (BOAS), and others. Further, this disclosure may be applicable outside the context of engine components, and may extend to the engine 20 itself, or components that are not used in an engine.

In one example, the engine component 60 is provided in a high pressure turbine 54 of the engine 20. This disclosure is not limited to components located within the high pressure turbine 54, however, and extends to components in other sections of the engine 20.

The component 60 in this example includes a root 62, a platform 64, and an airfoil section 66 extending in the radial direction Z, which is generally normal to the engine central longitudinal axis A. The airfoil section 66 terminates at a tip 68. The airfoil section 66 further includes pressure and suction side walls 70, 72 extending between a leading edge 74 and a trailing edge 76. The airfoil section 66 may be directly exposed to relatively hot gases within the core flow path C during operation of the engine 20. Accordingly, the component 60 may include one or more cooling features, as will be discussed below.

In the illustrated example, the component 60 includes a plurality of internal passageways for directing a flow of cooling fluid within the airfoil section 66 during engine operation. The component 60, in this example, includes a leading edge passageway 78, a serpentine passageway 80, and a trailing edge passageway 82. Each of the passageways 78, 80, 82, may include a plurality of turbulators, such as pedestals, angled trip strips 84 or chevron-shaped trip strips 86. Other trip strip shapes come within the scope of this disclosure.

The leading edge passageway 78 is in fluid communication with a plurality of showerhead holes 88. The showerhead holes 88 are configured to direct a flow of fluid from the leading edge passageway 78 to the exterior of the airfoil section 66 to create a film of cooling fluid adjacent the leading edge 74 of the component 60.

The serpentine passageway 80 includes a first leg 90 extending in the radial direction Z, and a turn 92 adjacent the tip 68 of the airfoil section. The turn 92 essentially turns a flow of fluid from the first leg 90 to a second leg 94, which is generally parallel to the first leg 90.

The trailing edge passageway 82 runs parallel to the first and second legs 90, 94, and is configured to direct a flow of fluid along the trailing edge 76. In this example, the fluid exits the airfoil section 66 at the trailing edge 76. The trailing edge passageway 82 may be fed from the second leg 94, or may be provided with a flow of cooling fluid from another source.

The engine component 60 may be initially formed, in one example, by using a casting technique, such as investment casting. The engine component 60 may be formed using other techniques, such as forging, additive manufacturing, etc. This disclosure may be particularly beneficial in the context of additive manufacturing, where partially fused particles may need to be cleaned before being used in an engine.

In one example of this disclosure, the internal passages of the engine component 60 are machined following initial forming (e.g., casting, forming, additive manufacturing) by establishing a flow of a machining fluid F within the internal passages. The machining fluid F is configured to flow through the internal passageways 78, 80, 82 for a specified, predetermined time to partially erode (e.g., etch, grind) the internal passages, and in particular to change an initial dimension (e.g., a dimension provided from the initial forming process) of the internal passageways 78, 80, 82.

As illustrated in FIG. 2, the engine component 60 may be arranged relative to a machining system 95 including a source of machining fluid 96, a control 97, and one or more pumps, valves, and conduits for routing the machining fluid F relative to the component 60. The control 97 is configured to send instructions to selectively establish a flow of machining fluid F within the component 60.

The machining fluid F may be any known type of machining fluid. Generally, machining fluid F is configured to machine surfaces that are substantially normal to a flow path of the machining fluid F. In one example, the machining fluid F includes a chemical solvent (e.g., an acid or a base). The solvent is configured to erode certain materials, such as metals and ceramics. In another example, the fluid F may include a grit media suspended within a base fluid (such as water or air). The grit media is configured to essentially grind or etch material as it flows over that material.

A flow of the machining fluid F is provided within the engine component 60 for a predetermined amount of time. The amount of time machines the internal passageways to enhance cooling without damaging the engine component 60. The amount of time may be determined based on a model, trial and error, or both.

Further, during machining, it may be important in some examples to match the Reynolds number of the expected cooling flow with the machining fluid F. Doing so simulates the expected operating conditions of the engine component 60, which increases the effectiveness of the fluidic machining process.

Figure 3A:
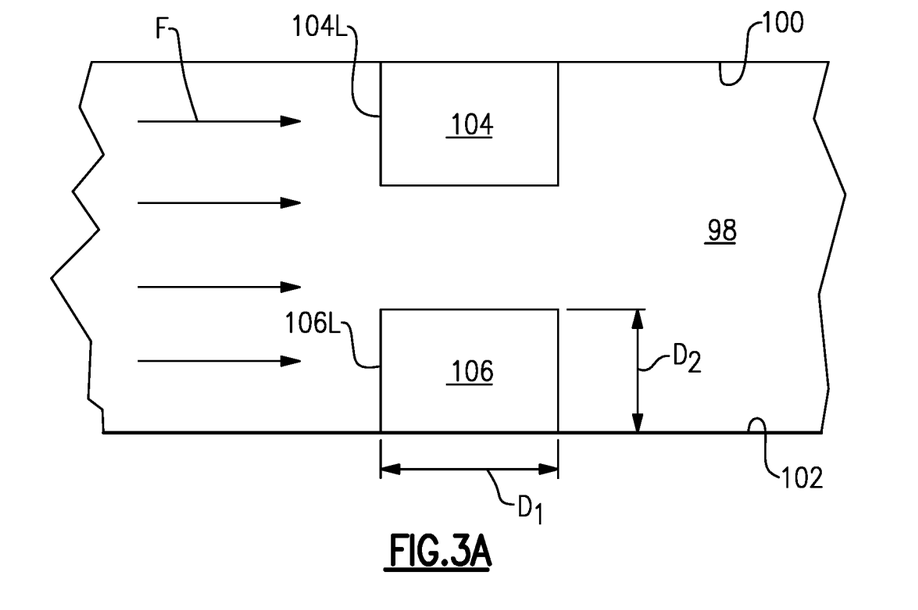
FIG. 3A illustrates an example internal passageway including two turbulators.

With reference to FIG. 3A, an example passageway 98 of the engine component 60 is illustrated. The passageway 98 is representative of any of the passageways 78, 80, 82. In this example, the passageway 98 includes opposed walls 100, 102, each including a respective trip strip 104, 106 projecting into the passageway 98 and toward the opposite wall 100, 102.

After the passageway is initially formed (e.g., following casting), each of the trip strips 104, 106 extends a first distance $D_1$ along the length of the passageway 98, and extends a second distance $D_2$ from a respective wall 100, 102 into the passageway 98. In this example, the trip strips 104, 106 initially have a rectangular shape (having a length $D_1$, and a height $D_2$) in cross-section. Additionally, the trip strips 104, 106 each include a leading edge 104L, 106L substantially normal to a respective wall 100, 102.

As illustrated in FIG. 3A, a flow of machining fluid F is introduced into the passageway 98 for a predetermined time. As mentioned above, the machining fluid F is configured to interact with surfaces that are substantially normal to the flow of machining fluid F. Accordingly, the machining fluid F changes the outer contour and overall dimensions of the trip strips 104, 106.

Figure 3B:
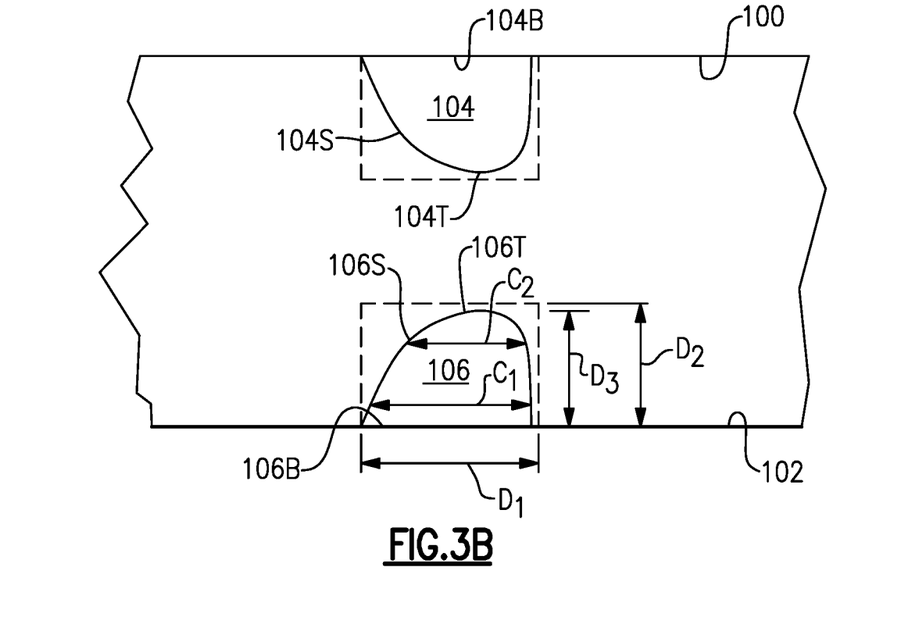
FIG. 3B illustrates the internal passageway of FIG. 3A following fluidic machining.

In particular, the machining fluid F essentially rounds the edges of the trip strips 104, 106, and provides the trip strips with a substantially sloped, arcuate contour 104S, 106S, as illustrated in FIG. 3B. The initial contour of the trip strips 104, 106 is shown in phantom in FIG. 3B. Additionally, the height of the trip strips 104, 106 may be reduced from $D_2$ to $D_3$. The length $D_1$ of the trip strips 104, 106 is also not uniform along the height of the trip strips. That is, a first chord $C_1$ adjacent a base 104B, 106B of the trip strips 104, 106 is larger than a second chord $C_2$ adjacent the top of the trip strips 104T, 106T.

The sloped contour 104S, 106S of the trip strips 104, 106 (FIG. 3B) is more aerodynamic and less likely to create stagnation than the substantially normal leading edges 104L, 106L (FIG. 3A). Further, the sloped contour enhances the ability of the trip strips 104, 106 to create vortices within a flow of cooling fluid, and therefore increases cooling effectiveness.

Figure 4A:
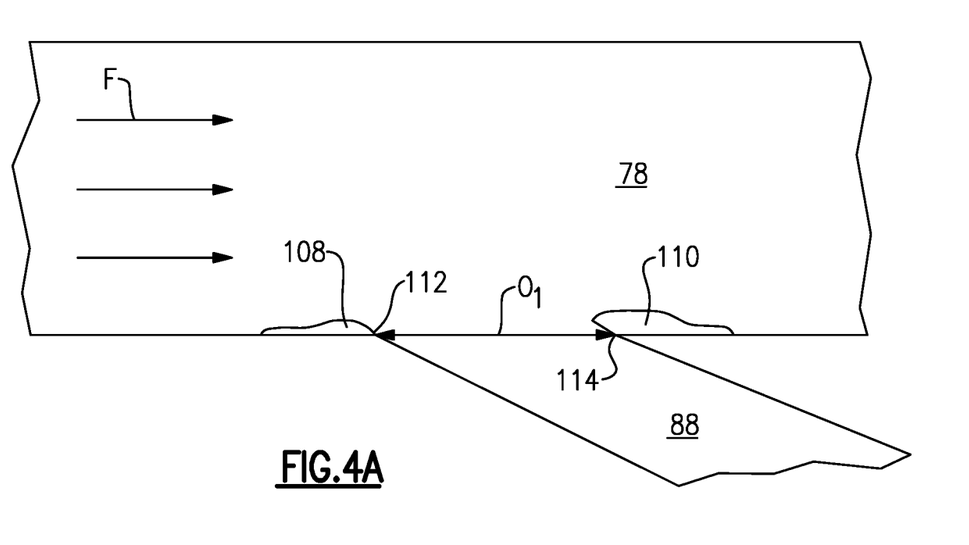
FIG. 4A illustrates an example film hole entrance.
Figure 4B:
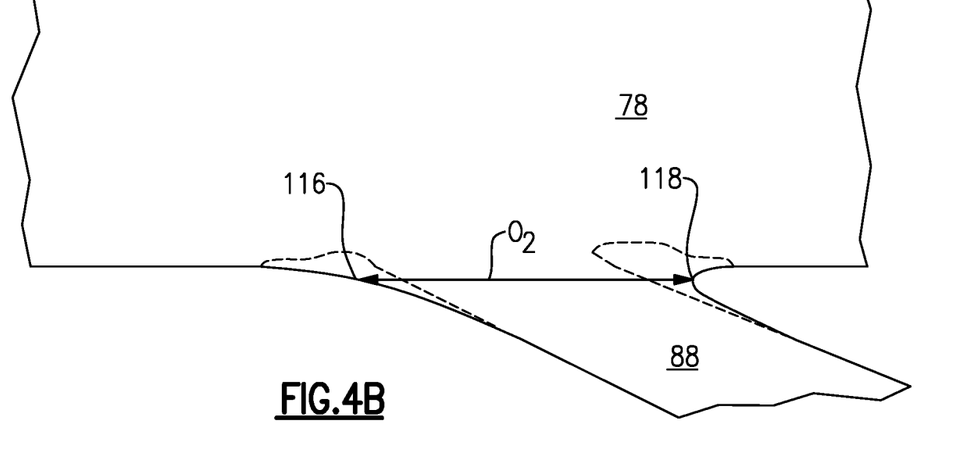
FIG. 4B illustrates the film hole entrance of FIG. 4A following fluidic machining.

FIGS. 4A-4B illustrate the above-discussed concept in the context of the leading edge passageway 78 and the showerhead holes 88. In some examples, the engine component 60 is not initially formed with the showerhead holes 88 having a diameter $O_1$. Accordingly, the showerhead holes 88 may be formed by a drilling process, for example. This process may leave excess material (e.g., burrs) 108, 110 at the intersection between the leading edge passageway 78 and the showerhead hole 88. There otherwise may be sharp corners 112, 114 between the leading edge passageway 78 and the showerhead holes 88.

The machining fluid F is provided along the leading edge passageway 78 and erodes the excess material 108, 110 and the sharp corners 112, 114 to provide an essentially smooth, aerodynamic contour, illustrated at 116, 118 between the leading edge passageway 78 and the showerhead hole 88. The machining fluid F further increases the diameter of the showerhead hole 88 adjacent the leading edge passageway 78 from $O_1$ to $O_2$. This increases the ability of fluid to enter the showerhead holes 88 and reduces stagnation (which, in turn, enhances cooling).

Figure 5A:
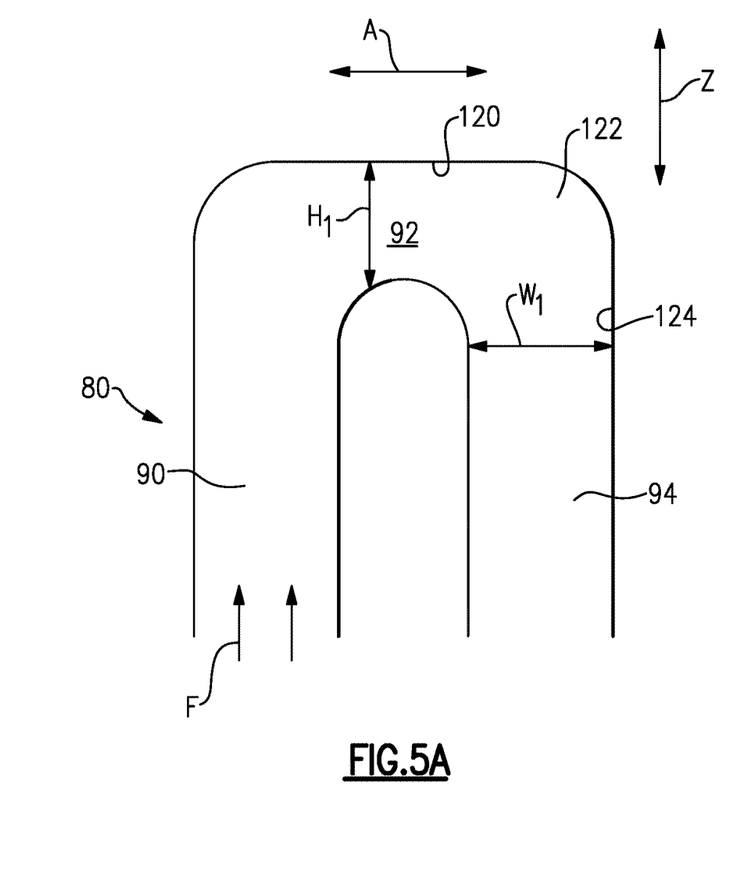
FIG. 5A illustrates an internal passageway including a serpentine turn.
Figure 5B:
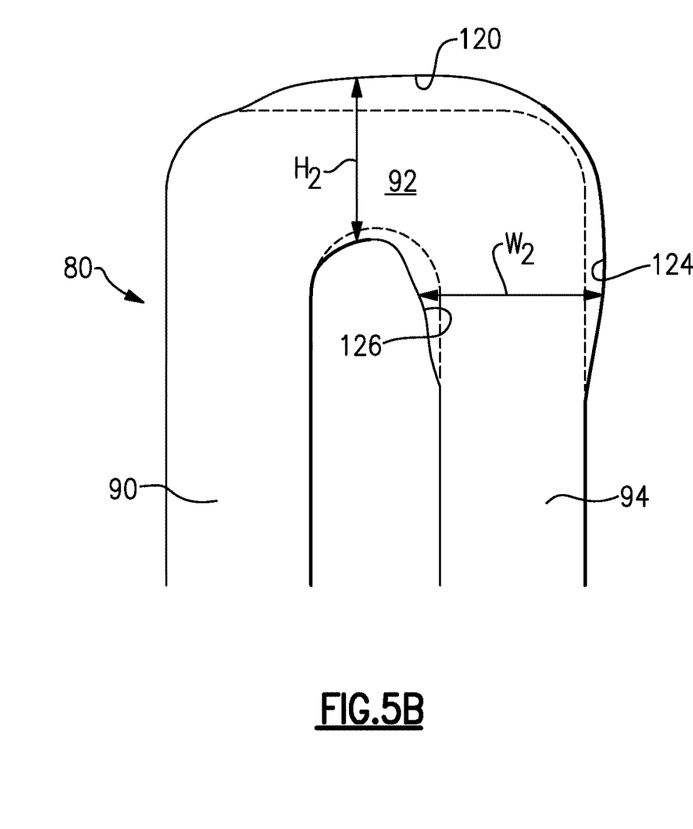
FIG. 5B illustrates the internal passageway of FIG. 5A following fluidic machining.

FIGS. 5A-5B illustrate a serpentine passageway 80. In this example, a turn 92 is bounded in the radial direction Z by a radially outer wall 120. After initial forming, the turn 92 includes a first height $H_1$. Cooling fluid may become stagnant at a potential stagnation point 122 between the outer wall 120 of the turn 92 and an outer wall 124 of the second leg 94. After initial forming, the second leg 94 includes a first width $W_1$.

As illustrated in FIG. 5B, the machining fluid F partially erodes the outer wall 120, increasing the height of the turn 92 from $H_1$ to $H_2$, and provides the outer wall 120 with a substantially arcuate, rounded contour. The machining fluid F further erodes the second leg 94, increasing the width of the second leg 94 from $W_1$ to $W_2$ by machining into both the outer wall 122 and the inner wall 126 of the second leg 94. These increased dimensions $H_2$, $W_2$ adjacent the potential stagnation point 122 increase the ability of cooling flow to make the turn between the legs 90, 94.

While FIGS. 3A-5B illustrate three examples where fluidic optimization is beneficial, it should be understood that this disclosure is not limited to use in a particular portion of the engine component. That is this disclosure extends to other internal passageways that may require internal optimization.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A method of forming an engine component, comprising:
    forming an engine component having an internal passageway, the internal passageway formed with an initial dimension; and
    establishing a flow of machining fluid within the internal passageway in a same direction as an expected direction of a flow of cooling fluid within the internal passageway during operation of an engine, the machining fluid changing the initial dimension, wherein the flow of machining fluid exhibits a Reynolds number substantially matching an expected Reynolds number of a flow of cooling fluid within the internal passageway during operation of an engine.

2. The method as recited in claim 1, wherein the internal passageway is a serpentine-shaped passageway including a turn connecting two legs.

3. The method as recited in claim 2, wherein the machining fluid enlarges a dimension of the turn.

4. The method as recited in claim 3, wherein the machining fluid enlarges a dimension of the internal passageway.

5. The method as recited in claim 1, wherein the internal passageway is in communication with a hole configured to communicate fluid from the internal passageway to the exterior of the component.

6. The method as recited in claim 5, wherein the machining fluid removes burrs adjacent the interface between the internal passageway and the hole, and enlarges a dimension of the hole adjacent the internal passageway.

7. The method as recited in claim 1, wherein the internal passageway comprises a turbulator, and the turbulator is one of a trip strip and a pedestal.

8. The method as recited in claim 1, wherein the machining fluid is configured to partially erode a material of the engine component, and includes one of (1) a chemical solvent and (2) a suspended grit media.

9. The method as recited in claim 1, including forming the engine component using one of an additive manufacturing technique, a forging process, and a casting process before introducing the machining fluid into the internal passageway.

10. The method as recited in claim 1, wherein the engine component includes a plurality of internal passageways, and wherein a flow of machining fluid is established within each of the internal passageways.

11. The method as recited in claim 1, wherein the machining fluid is provided in the internal passageway for a predetermined time.

12. A method of forming an engine component, comprising:
    forming an engine component having an internal passageway, the internal passageway formed with an initial dimension; and
    establishing a flow of machining fluid within the internal passageway, the machining fluid changing the initial dimension, wherein the flow of machining fluid exhibits a Reynolds number substantially matching an expected Reynolds number of a flow of cooling fluid within the internal passageway during operation of an engine.

* * * * *